United States Patent [19]

Minami et al.

[11] Patent Number: 4,805,690
[45] Date of Patent: Feb. 21, 1989

[54] COOLING ROLLER

[75] Inventors: Kunihiko Minami, Osaka; Akimichi Noyori, Tokyo, both of Japan

[73] Assignees: Sun A. Chemical Industries Co., Ltd.; Sasakura Engineering Co., Ltd., Tokyo, both of Japan

[21] Appl. No.: 189,625

[22] Filed: May 3, 1988

[30] Foreign Application Priority Data

May 9, 1987 [JP] Japan ............................... 62-112215

[51] Int. Cl.⁴ .......................... F28F 5/02; F28D 15/02
[52] U.S. Cl. ....................................... 165/89; 165/86; 165/104.25
[58] Field of Search ................. 165/86, 89, 90, 104.25

[56] References Cited

U.S. PATENT DOCUMENTS 2,909,849 10/1959 Hornbostel ........................... 165/89

FOREIGN PATENT DOCUMENTS 641263 1/1979 U.S.S.R. ................................ 165/89
720280 3/1980 U.S.S.R. ................................ 165/86

Primary Examiner—Albert W. Davis, Jr.
Attorney, Agent, or Firm—Marshall, O'Toole, Gerstein, Murray & Bicknell

[57] ABSTRACT

A cooling roller of a cooling machine for continuously and quickly cooling a high temperature sheet. The cooling roller comprises a rotary shaft, and a cylindrical outer wall and end walls mounted on the shaft and forming an enclosure are mounted on the shaft. A tube bundle extends through the enclosure close to the outer wall, the tube bundle having an inlet and an outlet for a cooling fluid. The heat transfer area of the tube bundle is larger than the inner area of said outer wall, and the inner area of the outer wall is covered with a heat transfer accelerating device. A heat transfer liquid, which repeats evaporation and condensation cycles during use is sealed within the enclosure.

2 Claims, 2 Drawing Sheets

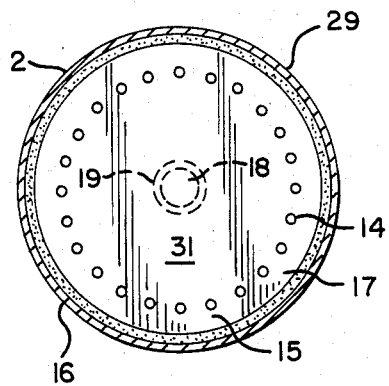
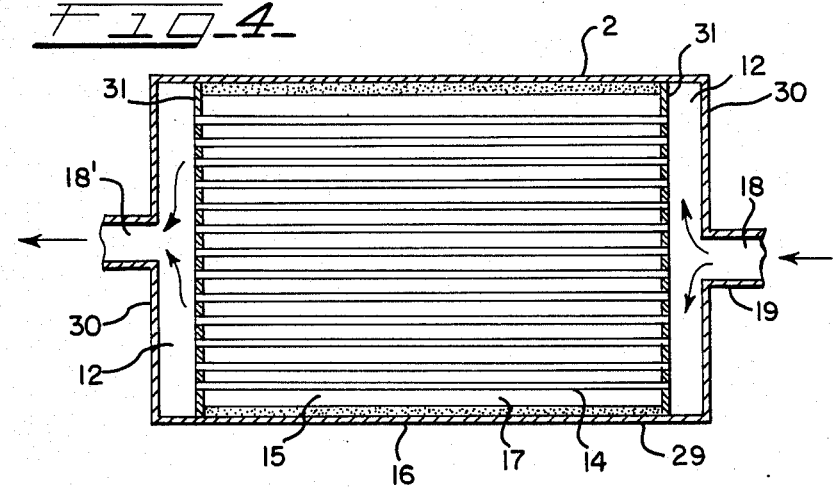
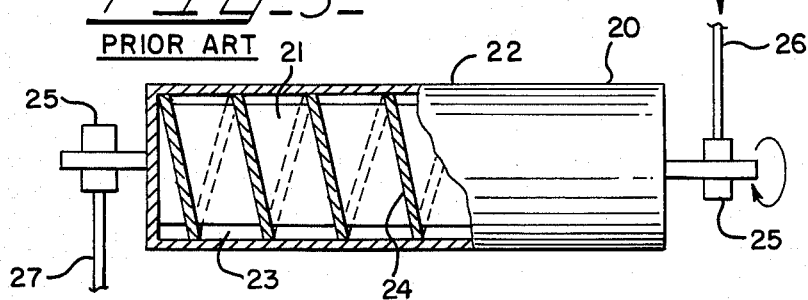

COOLING ROLLER

FIELD AND BACKGROUND OF THE INVENTION

This invention relates to a rotary cooling roller of a machine for producing a film or sheet of cellophane, polyethylene, aluminum foil, paper or the like, resin finishing machines, laminating machines and extrusion laminating machines for bonding or laminating two or more films or sheets of material, or bonding or laminating different kinds of film or sheets to add properties such as higher strength, heat resistance, water resistance, for example.

In the prior art, for example when paper and synthetic resin films are bonded together to form a strong paper, the conventional cooling machine uses a cooling roller 20 of the type shown in FIG. 5. In the cooling roller 20 of FIG. 5, a water channel 23 is formed between concentric inner and outer cylinders 21 and 22. The cylinders have a space between them which forms a water channel, and a spiral guide partition 24 is mounted in the water channel. Rotary joints 25 are used at the ends of the rotary shaft and have water passages in them, to allow water entering from a cooling water inlet 26 to flow through in a spiral path through the channel and out of a cooling water outlet 27.

In a typical process, thermally melted synthetic resin is flowed down on the raw material paper, and a film of the resin and raw material paper are pressed and bonded together by the nip or pressure application portion between said cooling roller 20 and a pressure roller (not shown) installed next to said cooling roller. While moving over the surface of the cooling roller 20, the synthetic resin is cooled to harden it and to maintain a certain degree of flexibility. Then the product is taken up by a take-up roller (also not shown).

In the aforementioned cooling process, a problem may arise if the synthetic resin is not evenly cooled because the adhesive strength may be unevenly distributed or the surface condition may be defective. Hence the cooling roller must have the function of evenly and efficiently cooling the entire periphery along the full length of the roller.

In the cooling roller having the aforementioned construction, however, the difference in temperature between the inlet cooling water and the outlet cooling water has a direct effect on the surface temperature of the roller, and it is difficult to achieve an even cooling across its width. It is then necessary to control the difference of the cooling water temperature within a narrow range. This poses such a problem that a large quantity of cooling water is required to flow through the roller. Even if the difference of the temperature between the inlet cooling water and the outlet cooling water is kept small, the improvement in heat transfer between the cooling water and the roller surface is limited, and the difference in temperature of the roller surface in the direction of its width has not been improved significantly. It, therefore, is desirable to provide a roller which assures a more even cooling temperature distribution.

In the aforementioned construction, the heat transfer is effected by forced convection, and the heat transfer coefficient is low. Furthermore, as the heat transfer surface is easily fouled, the heat transfer performance is lowered further. To increase the cooling performance, it has been the practice to adopt a large-sized cooling roller, which, however, results in a larger machine size. The problem is not limited to it. Directly above the cooling roll, there are dies from which molten resin flows down in a film form. Because the size of the dies is limited, the distance between the dies and the cooling roller becomes greater, thereby affecting the properties of the product.

Because the size of the product varies from product to product, the cooling roller must be exchanged to meet various standards. Replacement of such a long and large cooling roller is quite troublesome.

As for prior art which is similar to evaporation cooling, the Japanese Utility Model Publication No. 58-49489 discloses a heat pipe roller. In its construction, an inner cylinder having a heater is provided with wick. The roller is used as a fixing roller of an electrophotographic machine, and is exclusively for heating, and cannot be used for cooling which is the objective of the present invention.

SUMMARY OF THE INVENTION

A cooling roller in accordance with this invention is for use in a cooling machine for continuously and quickly cooling a high temperature sheet. The cooling roller comprises a rotary shaft, and a cylindrical outer wall and end walls mounted on the shaft and forming an enclosure are mounted on the shaft. A tube bundle extends through the enclosure close to the outer wall, the tube bundle having an inlet and an outlet for a cooling fluid. The heat transfer area of the tube bundle is larger than the inner area of said outer wall, and the inner area of the outer wall is covered with a heat transfer accelerating device. A heat transfer liquid, which repeats evaporation and condensation cycles during use is sealed within the enclosure.

BRIEF DESCRIPTION OF THE DRAWINGS

The invention will be better understood from the following detailed description taken in conjunction with the accompanying figures of the drawings, wherein:

FIG. 3 is a sectional view taken on line 3—3 of FIG. 2;

FIG. 4 is a sectional view taken on line 4—4 of FIG. 2; and

FIG. 5 is a view partially in section of a conventional cooling roller.

DETAILED DESCRIPTION OF THE DRAWINGS

Figure 1:
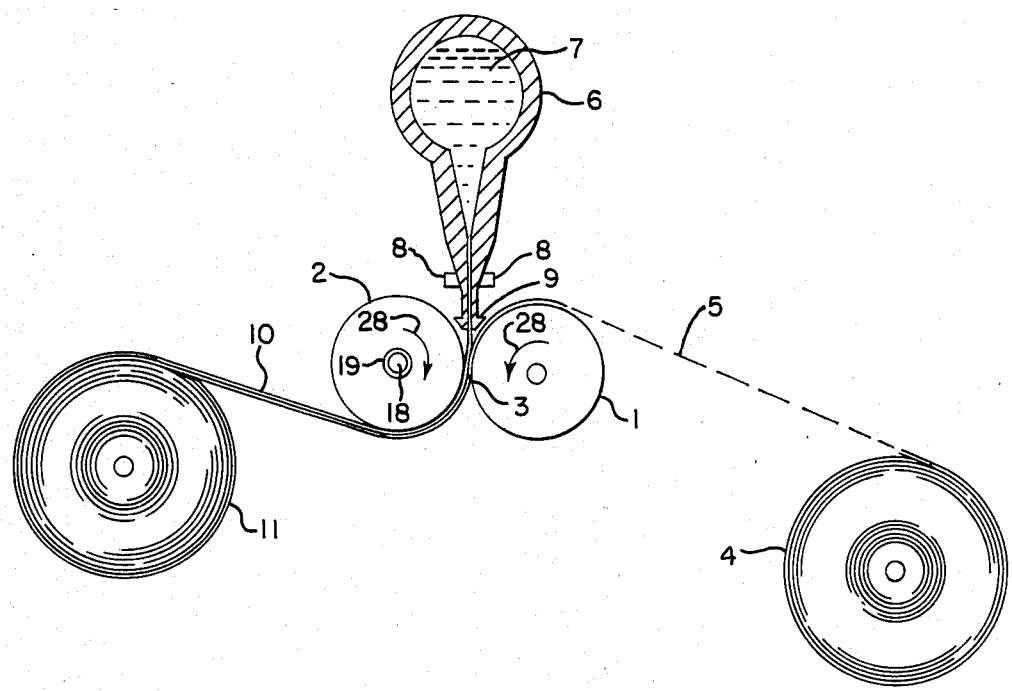
FIG. 1 is a diagram of a laminating process including a cooling roller in accordance with the present invention.

With reference to FIG. 1, a pressure roller 1 and a cooling roller 2 according to this invention engage with each other at a pressure applying part or nip 3. The rollers are arranged to rotate in opposite directions as indicated by the arrows 28. A guide plate (not illustrated) is provided to guide a sheet of raw material paper 5 from a raw material supply paper roller 4 on which the raw material paper 5 is wound, up to the pressure roller 1. A resin holder or supply 6 for holding a molten resin 7 is preferably heat-insulated on the outside by a heat insulator (not illustrated), and it is located above the nip 3. The resin holder 6 has dies 9 at its bottom, and a heater 8 is provided directly above the dies 9. The dies 9 are located perpendicularly above the pressure applying part or nip 3. The number 10 denotes a laminated paper-resin product which includes the molten resin 7 and the raw material paper 5 pressed together and then cooled in order to bond them. The dashed line represents the paper and the solid line represents the resin, the number 11 denotes a take-up roller which rolls up the laminated product 10. A guide plate (not illustrated) is preferably provided to guide the laminated product 10 from the cooling roller 2 to the take-up roller 11.

The cooling roller 2 includes a rotary shaft 19 which rotatably supports the roller 2 on the machine. The number 18 denotes a water inlet and the number 18' denotes a water outlet (see FIG. 4) provided at the opposite ends of the shaft 19 of the cooling roller 2.

Figure 2:
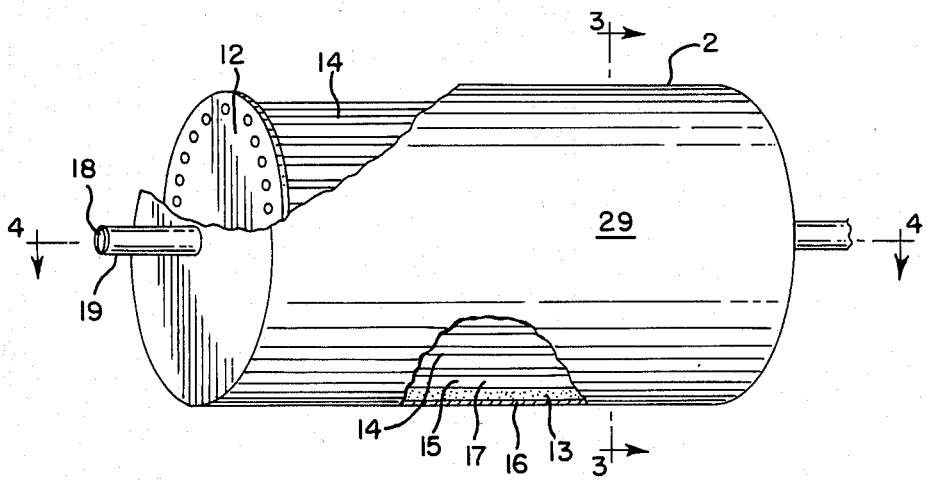
FIG. 2 is a perspective view partially in section of the cooling roller with a single row arrangement.

As shown in FIGS. 2, 3 and 4, the cooling roller 2 has a cylindrical outer wall 29, and water chambers 12 are provided at both ends between end plates 30 of the roller and internal bulkheads 31. A bundle of cooled tubes 14 extend between the bulkheads 31 and are located close to the inner surface 13 of the cylindrical wall 29. A gap 15 is present between the inner surface 13 and the water-cooled tube bundle 14, and a cylindrical wick 16 is mounted against the inner surface 13. The roller is filled with a heat transfer liquid 17, and it is under vacuum. As shown, in FIGS. 3 and 4, the tube bundle 14 is formed by a plurality of separate tubes arranged in a single circular row which is radially inside the wick 16. The ends of the tubes 14 open into the two water chambers 12 so that cooling water can flow through the tubes. The tubes may be arranged in various configurations such as in two or more coaxial rows and various numbers of tubes may be provided, according to the required cooling capacity.

The foregoing specific example of the present invention functions as follows:

As shown in FIG. 1, polyethylene resin, for example, which is contained in the resin holder 6 and is heated up to about 300° C. by a heating means (not illustrated) to turn it into the molten resin 7.

This molten resin 7 is further heated by the heater 8 and is allowed to flow down through the dies 9 in a film form and fall onto the pressure applying part or nip 3. At the same time, the raw material paper is withdrawn from the raw material paper roller 4 and is guided to the pressure roller 1. As the rollers turn, the molten resin 7 and the raw material paper 5 are pressed together at the pressure applying nip 3, and the resulting lamination is evenly cooled by the latent heat of evaporation of the heat transfer liquid 17 sealed up within the cooling roller 2 along the full width of the cooling roller 2, to form the laminated end product 10. The product is then guided to and taken up by take-up roller 11. The heat transfer liquid 17 within the cooling roller 2 is evaporated by the heat from the molten resin 7 passing over the outer circumferential wall 29 of the cooling roller 2, and the vapor contacts the tubes, and the vapor is then condensed by the water-cooled tube bundle 14 to release heat. The heat transfer liquid is then gathered to the wick 16 mounted on the inner surface 13 of the cooling roller 2 by the centrifugal force or under gravity. Thus the heat transfer liquid 17 repeats the cycles of evaporation and condensation and is repeatedly usable semipermanently.

It will be apparent therefore that, in the present invention, in place of direct water cooling as in the prior art, a rotary type thermosyphon cooling system is provided wherein a working fluid forms a heat transfer liquid which is capable of maintaining an even temperature at the inlet and outlet of the feedwater as well as at the cooling roller surface. In addition, the present invention provides a water-cooled tube bundle which is installed inside the roller, which forms a larger surface area than that of the wall of the cooling roller. With this configuration, the heat absorbed by the cooling roller evaporates the working fluid sealed inside, and the generated vapor contacts the water-cooled tube bundle and condenses to release heat. This heat of condensation is transferred to the cooling water flowing inside the tubes of the water-cooled tube bundle and is then released by the water outside of the cooling roller. The inner surface of the cooling roller is provided with a wick, which may be reinforced by a wire mesh, to evenly distribute the working fluid in the circumferential direction and to improve the heat transfer coefficient. Instead, the inner surface of the cooling roller itself may be worked to achieve the same objective. Hence the cooling roller is capable of receiving and transferring heat at high speed rotation or in a nearly stationary condition.

In summary, the cooling roller comprises a metal roller in which a water-cooled tube bundle rotates coaxially together with said roller. The tube bundle is provided next to the circumferential wall of the roller, and a small quantity of a heat transfer liquid (also referred to as a working fluid) is sealed up in said roller under reduced pressure or a vacuum. The working fluid is heated up by a high temperature film sheet moving along the outer circumferential wall of the roller, which causes the fluid to evaporate. The generated vapor within the roller is then cooled by the water flowing in the water-cooled tube bundle, causing the working fluid to condense. As the water-cooled tube bundle is installed near the inner wall of the cooling roller, the evaporated working fluid condenses immediately. Furthermore, because the heat transfer area of the water-cooled tube bundle is large, quick cooling is effected almost instantly. The heat transfer efficiency of cooling by evaporation and condensation is significantly greater than the conventional simple water cooling.

The condensed heat transfer liquid is separated from the water-cooled tube bundle by the centrifugal force due to the rotation of the cooling roller and then distributed almost evenly on the inner wall of the cooling roller. As a result, in combination with the effect due to evaporation and condensation, the heat transfer coefficient is improved over that of the stationary condition by several tens of percents.

Because the cooling roller of the present invention employs, in place of the conventional water-cooled roller having a large difference in temperature, a rotary type thermosyphon cooling roller in which evaporation and condensation repeatedly occur for cooling a high temperature film sheet, the cooling roller is capable of evenly cooling the high temperature film sheet across its full width and length, and does not cause any defects in quality of the end product due to uneven cooling.

Since the heat transfer efficiency of the cooling roller according to the present invention is good, the size of the cooling roller can be reduced while exhibiting a comparable performance. When the size of the cooling roller is identical to that of the conventional water-cooled roller, the production of the product, such as a resin finished product, can be increased since the rotation rate may be raised.

As the tubes of the water-cooled tube bundle are located close to the inner circumferential surface of the cooling roller, the number of the tubes can be greater than in the case where the tubes are located in the center of the roller, and in turn the heat transfer area can be greater. Since the water-cooled tube bundle is very close to the vapor of the heat transfer liquid, its condensation is promoted. Because the inner circumferential surface of the cooling roller is covered with a heat transfer accelerating means (which may be a wire mesh of copper, stainless steel or nickel, a wick of felt, form metal, thin threads, or sintered material), when the cooling roller is rotated, the condensed heat transfer liquid will drop over the accelerating means by the centrifugal force in the case of high speed rotation or by gravity in the case of low speed rotation, and then diffuse almost evenly due to capillary action. As a result, the heat transfer is effected reliably and the cooling efficiency is improved.

The heat transfer area of the water-cooled tube bundle is made larger than the inner circumferential area of the cooling roller. Thus the heat transfer liquid, which is evaporated by exposure to high temperature directly beneath the cooling roller surface, is sufficiently cooled by the large area water-cooled tube bundle so that the temperature of the heat transfer liquid is held low. Accordingly, although the inner circumferential area of the cooling roller is limited, the heat transfer through the circumferential surface of the cooling roller can be maintained at a high level of efficiency. Further, as the heat transfer of the inner surface of the cooling roller is efficiently effective, the size of the cooling roller itself can be reduced. As a result, the heat exchange of the cooling roller according to the product item will be facilitated considerably.

The heat transfer or working fluid should have a low boiling temperature at the vacuum within the roller, and the boiling temperature should be lower than the temperature to which the roller wall is heated during use. Thus the choice of the working fluid depends on the temperature of the wall during use and the pressure within the roller. For example, freon or alcohol may be used.

What is claimed is:

1. A cooling roller of a cooling machine for continuously and quickly cooling a high temperature sheet, said cooling roller comprising a rotary shaft, a cylindrical outer wall and end walls mounted on said shaft and forming an enclosure, a tube bundle extending through said enclosure and close to said outer wall, said tube bundle having an inlet and an outlet for a cooling fluid, the heat transfer area of said tube bundle being made larger than the inner area of said outer wall, the inner area of said outer wall being covered with a wick, and a heat transfer liquid, which repeats evaporation and condensation cycles during use, sealed within said enclosure.

2. A cooling roller which is normally heated during use, said roller comprising a cylindrical outer wall and end plates which form a sealed enclosure, rotary means for rotatably supporting said roller, a heat transfer liquid within said enclosure, and cooling means extending through said enclosure for removing heat from said liquid, said cooling means comprising a plurality of cooling liquid flow tubes which extend through said enclosure, and the surface area of said tubes being greater than the surface area of said outer wall.

* * * * *